(12) United States Patent
Jellum et al.

(10) Patent No.: US 6,915,482 B2
(45) Date of Patent: Jul. 5, 2005

(54) METHOD AND ARRANGEMENT FOR WEB INFORMATION MONITORING

(75) Inventors: Harald Jellum, Baerums Verk (NO); Morten Rynning, Sandvika (NO)

(73) Assignee: Cyber Watcher AS, Lysaker (NO)

( * ) Notice: Subject to any disclaimer, the term of this patent is extended or adjusted under 35 U.S.C. 154(b) by 794 days.

(21) Appl. No.: 09/818,618

(22) Filed: Mar. 28, 2001

(65) Prior Publication Data

US 2002/0143813 A1 Oct. 3, 2002

(51) Int. Cl.[7] .......................... G06F 15/00; G06F 17/00; G06F 17/21
(52) U.S. Cl. ............................ 715/511; 707/4; 707/10; 709/224
(58) Field of Search ............................ 715/511; 707/4, 707/10; 709/224

(56) References Cited

U.S. PATENT DOCUMENTS

| | | | | |
|---|---|---|---|---|
| 5,826,258 A | * | 10/1998 | Gupta et al. ................... | 707/4 |
| 5,978,828 A | * | 11/1999 | Greer et al. ................ | 709/224 |
| 6,366,933 B1 | * | 4/2002 | Ball et al. ................... | 715/511 |
| 6,460,038 B1 | * | 10/2002 | Khan et al. ................... | 707/10 |
| 6,681,369 B2 | * | 1/2004 | Meunier et al. ............ | 715/511 |

OTHER PUBLICATIONS

Huck, G. et al., Jedi: extracting and synthesizing information from the Web, IEEE, Aug. 20–22, 1998, pp. 32–41.*

Aggarwal, S. et al., WIRE—a WWW based information retrieval and extraction system, IEEE, Aug. 26–28, 1998, pp. 887–892.*

* cited by examiner

Primary Examiner—William L. Bashore
(74) Attorney, Agent, or Firm—Young & Thompson (57) ABSTRACT

A method and arrangement in a computer client/server constellation provides a web page information element monitoring service to a subscribing user. The client part (100) in co-operation with the first browser, operated by the user, acquires a user specified web page, generates a position specifying unique first ID on basis of a user selected first information object contained on the web page, and transfers the first ID to the server part (600). The server part (600), in co-operation with a second browser, reacquires the web page and generates a second unique ID on basis of a second information object found at a position provided by the first ID, and generates a change indicator if the second ID is different from the first ID. The change indicator triggers a notification of the detected change to the subscribing user.

4 Claims, 9 Drawing Sheets

SYSTEM STRUCTURE (Normal Internet Content)

FIG. 1 SYSTEM STRUCTURE (Normal Internet Content)

FIG. 2 CLIENT STRUCTURE

FIG. 3 CLIENT FLOW DIAGRAM

Fig. 4.A Sample web page,

P: Paragraph (This is an example..)
UL: Unordered list (Unordered Item 1..)
OL: Ordered list (Ordered Item..)
LI: List Item (Items in UL or OL)
A: Anchor (link, CyberWatcher)

Fig 4.B Web page Tree

Note: Each task element can be different, such as text, picture, link, Flash animation or any other feature on a web page.

Result when user select number "100" of fig. 4.B:

Element ID: / 2 – 1 – 2 / 2 – 2 – 2

Table Delimiter

Table no – Row no – Column no

Fig. 4.C Element ID – Result

```html
<html>
 <head>
   <title>Sample Page</title>
 </head>
 <body>
     <p>
       This is a an example text
     </p>

<table border=1> <!-- First table on sample web page -->
        <tr>
          <td colspan="2"> </td> <!-- Row spans over two columns for first table -->
        </tr>
        <tr>
          <td> </td> <!-- First element of second row in first table contains no break space -->
          <td> </td>
        </tr>
     </table>

<table border=1> <!-- Second table -->
        <tr>
          <td>
            <table border=1> <!-- Child table of second table -->
              <tr>
                <td>
                  <ol>
                       <li>Ordered Item 1
                       <li>Ordered Item 2
                       <li>Ordered Item 3
                  </ol>
                </td>
                <td>   </td>
              </tr>
              <tr>
                <td> </td>
                <td> </td>
              </tr>
            </table>
          </td>
          <td>
            <table border=1>
              <tr>
                <td> </td>
                <td>
                  <a href="http://www.cyberwatcher.com/"> <!-- Anchor start -->
                    CyberWatcher <!-- Anchor text -->
                  </a> <!-- Anchor end -->
                </td>
              </tr>
              <tr>
                <td> </td>
                <td>100</td>
              </tr>
            </table>
          </td>
        </tr>
     </table>

<ul>
        <li>Unordered Item 1
        <li>Unordered Item 2
        <li>Unordered Item 3
     </ul>
 </body>
</html>
```

Fig. 4.D Sample web page source

FIG. 5A   Server Block diagram and connections to network / client

FIG. 5B  Server Data Structure

Fig. 5C  User Report Data Structure

FIG. 6 SERVER FLOW DIAGRAM

METHOD AND ARRANGEMENT FOR WEB INFORMATION MONITORING

BACKGROUND OF THE INVENTION

The invention relates to the field of computer data processing, and particularly to processing of structured data to detect a data change and to generate a notification in relation to the detected change.

DESCRIPTION OF THE RELATED ART

By the advent of the internet, enormous amounts of information have become easily accessible. The internet gives users access to more than 2.7 billion web sites, and the rate of growth has been shown to be about 80 new web sites per second. Thus, more than 550 billion documents may be accessed by users of the internet. Furthermore, a large part of the information being available through the internet is variable or floating information that may change over time, and users will more or less frequently access sites to check if the information of interest has been updated. Statistics have shown that 43% of internet users access about 20 web sites each month to look for such updates. Accordingly, there is a need for a solution that will assist a user of web site information in finding out whether or not information at web site of interest has changes, such as for example by an update. Furthermore, there is a need for a solution as identified above, being capable of providing a notification to a user when a change is detected.

In the art, there are several solutions offered that provide a data monitoring service, some of which also provide a service capable of being personalized.

One category of existing solutions is regularly referred to as "MyPortal" solutions, such as for example those offered by the web sites of MyYahoo™, MoreOver™, Net2One™, LifeMinders™, Yoodle™ and Made4™. In the solutions, the user typically is given a choice to personalize a "My Portal Page", and a notification of change is delivered to that page. In the solutions, the selections of web sites (or other web information items) that are made available to the user for monitoring through the respective service is limited to those sites (or other web information items) that are specified by the monitoring service provider, or by some other entity with whom the monitoring service provider has a feeder agreement.

Another category of known web information monitoring services encompasses solutions typically referred to as "Wireless Alerts" solutions. Examples of such solutions can be found at the web sites of MyAlert™, IOBox™ and 12Snaps™. Web information monitoring by the solutions appear to be similar to those belonging to the previously mentioned "MyPortal" category, with the addition of a wireless notification service that notifies a subscribing user by means of a SMS or WAP message delivered to a mobile terminal of the user, such as for example a SMS or WAP message to a properly adapted mobile telephone.

Yet another category of known web information monitoring services include services referred to as "Agents". "Agents" allow a subscribing user to freely "select" a web page or similar information item of interest to monitor. When the "Agent" detects a change of the item being monitored, the user receives an e-mail notification.

Known solutions of any of the categories above, as well as those of other known categories not mentioned herein, have that in common that they are capable of monitoring only complete web pages or complete similar information items, and do not allow monitoring or alerting by detection of a change of only a limited specific part or a specific single information element of such a page or information item.

SUMMARY OF THE INVENTION

Accordingly, there is a need for another solution providing a web page or web information item monitoring service, the solution being capable of detecting a change of a specific part, section or element of an item being monitored. Preferably, the solution should also be capable of providing a notification of such a detected change to a monitoring service subscriber.

The above problems and objects are addressed by the present invention.

Other advantageous features of the present invention are disclosed below.

According to the present invention, a method of identifying a change of an information object contained in a structured web information assembly is provided, said method comprising: Specifying a structured web information assembly; acquiring said specified web information assembly from a source; selecting a first information object of said web information assembly; obtaining a structure location of said selected first information object within said structured information assembly; generating by a coding method a first identifier characteristic of said selected first information object; reacquiring said specified web information assembly from said source; obtaining a second information object located at said structure location within said reacquired web information assembly; generating by said coding method a second identifier characteristic of said second information object, and generating a change indicator if said second identifier is different from said first identifier.

According to the present invention, a client/server means arrangement in a system of network computers for detecting a change of an information object contained in a specific structured web information assembly is provided, said arrangement comprising: Said client means and a first web browser operating on a first computer, said client means being adapted to communicate with said first web browser, said client means being arranged to generate a first location specifying identifier characteristic of a user selected first information object included in a first browser acquisition of said web information assembly displayed to the user by means of said first web browser and to forward said first location specifying identifier to said server; and, said server means and a second web page browser operating on a second computer, said server means being adapted to communicate with said second web page browser, said server means being arranged to generate a second identifier characteristic of a second information object included in a second browser acquisition of said web information assembly at the location specified by the first identifier, and to generate an indicator of change if the second identifier is different from the first identifier.

In the method of the invention, determining the information object ID of the selected first information object advantageously comprises the steps of:

j) determining the web page table level of the web page table containing the selected information object;

k) setting a position and level variable to the selected object position and the web page level determined in step j), l) determining a web page row and column position of an information object at the position and level of the variable, and appending to the information object ID the level and position variable;

m) determining the object type of the selected information object, and if the object type is different from body, then including the steps of:

n) navigating in the structured information assembly to a position one level up from the current level, o) setting the position and level variable to the the position and level navigated to in step n), and repeating the steps l)–m).

In one aspect of the invention, the invention is adaptable to work with any browser enable content like internet, intranet, extranet, chat and news, and interfaces with other database sources with an html or XML interface.

In another aspect of the present invention, a client part of the invention can consist of an internet Explorer™ plug-in, where the user may activate monitoring of any web site surfed to by means of the first browser. The user is then allowed to monitor any part of a database, JavaScript, an element of a table or even a specific number in a large table, Such a plug-in will open a customized web band to set search criteria, and a graphical user interface which displays to the user which part of the web page has been selected for monitoring.

In yet another aspect of the present invention, the present invention can run as an ASP-solution, or as a local server farm to operate on the inside of a firewall.

In yet another aspect of the present invention, the invention can be implemented in an arrangement operated as a set of web services, which means that a third part can integrate the service into his/her own application, even though the service is hosted on web servers of others on the internet.

In yet another aspect of the present invention, the invention utilizes available browser technology, by residing on top of the component model inside the browser. In this way it is possible for a system including the present invention to reach all sites that are reachable with the browser, and the content is read back in its original structure, allowing use of intelligent algorithms to actually follow part or element of any web page of interest. Implementations of the present invention as a web service allows any third party to integrate a service into their own application as a normal "function"-call, even when the actual service is hosted on another web server on the net.

BRIEF DESCRIPTION OF THE DRAWINGS

In the following the invention will be explained by way of example and with reference to the accompanying drawings, where:

FIG. 4a depicts an exemplary web page information assembly, FIG. 4b illustrates a web page tree structure of the exemplary web page information assembly of FIG. 4a, FIG. 4c illustrates an element identifier of an information object contained in the exemplary web page information assembly of FIG. 4a, FIG. 4d shows a source code listing of the exemplary web page information assembly of FIG. 4a, FIG. 5a is a block diagram showing an exemplary server part of the present invention with connections to network/client.

DESCRIPTION OF THE PREFERRED EMBODIMENTS

Figure 1:
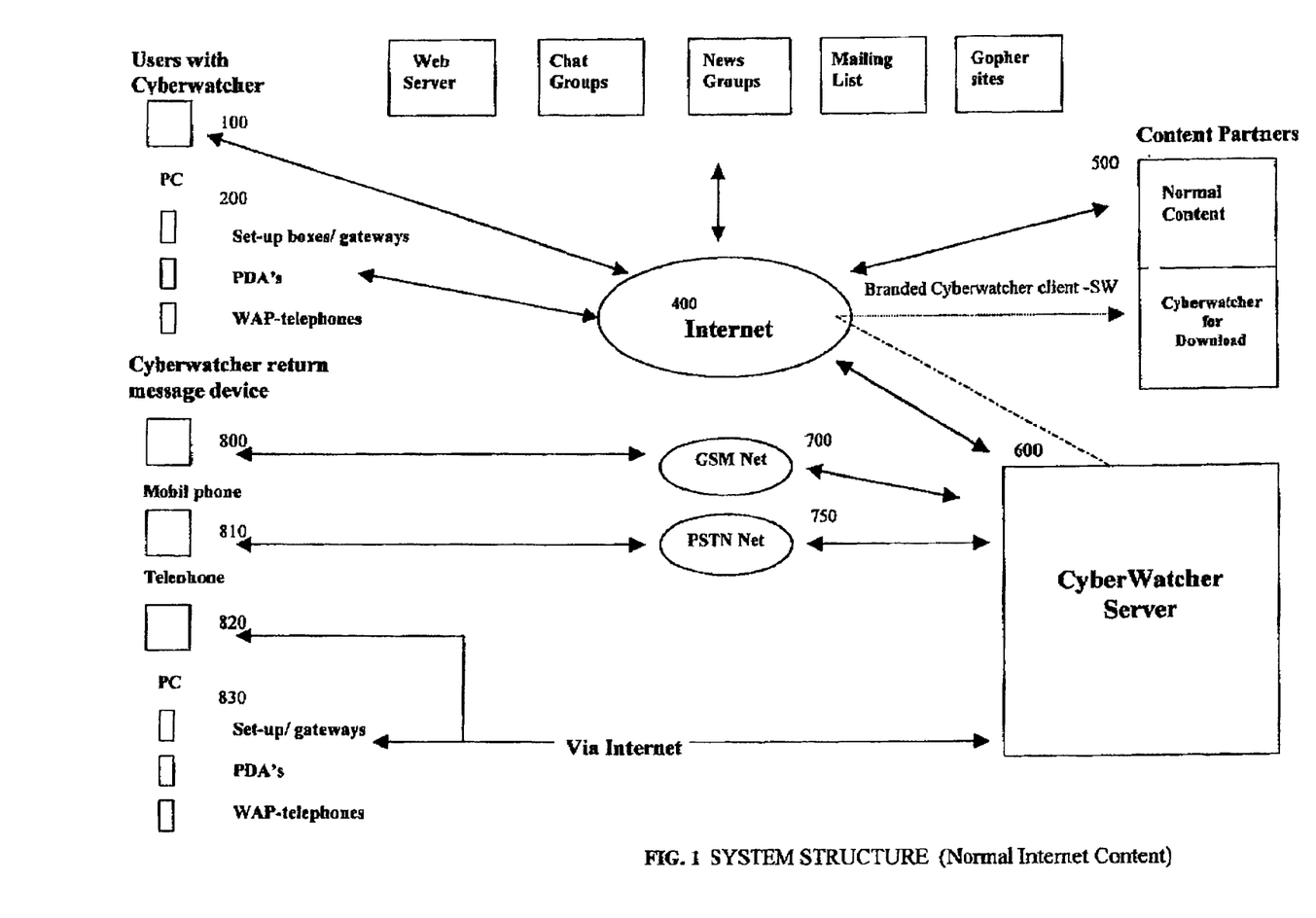
FIG. 1 is a block diagram showing a system structure incorporating the invention.

Referring now to FIG. 1, a general system incorporating the present invention will be explained. The system structure of FIG. 1 shows a possible total configuration including major elements, such as the client, server, message receivers, content partner and the internet. In the system, the Cyber-Watcher™ name is used as the reference of the total concept of the invention. In said system, a user, who operates a PC (100) or non PC (200) device, can download the client software part of the invention from a content partner (500) via the standard internet (400). After a first download of the client software, the user can start to set detailed "Watch-Points" on typical information items of interest (300–340), such as for example information items that are accessable through the internet and which can be selected and read by the user. After selecting the information of interest, the user will then utilize the client software for transferring the set "WatchPoint" data, such as the referenced URL, keywords and unique element ID which describes selected element position in the source description of the selected information item, as well as a time stamp and notification information, such as SMS/WAP/GPRS/UMTS or e-mail reference(s), to the "CyberWatcher" server part (600) of the invention. The server part (600) will acquire the specified information item of interest, and check to see of there are any changes according to the detailed "WatchPoints" set by the user. Checks of this type are typically done at specified time intervals, but can be made dependent on a detected or otherwise obtainable update frequency of the URL of the information assembly of interest. When the server part (600) finds a match according to the specifications or data of the set "Watch Points", the server part effects generating of change indicator, which indicator in turn can trigger sending to the user a notification according to information provided by the user, such as to the specified SMS/WAP/GPRS/UMTS, e-mail or "MyPortal" (610). The notification typically contains the actual content change including all html information, URL reference, time stamp, keywords, category and name of "WatchPoint", fitted into a return message device (800–830). The "MyPortal"-page (610) of the user can contain a list of all user set "WatchPoints", organised in groups of categories together with all reports generated from these. Furthermore, the reports can contain all html information as from the change source. In an enhanced system, tools are integrated to tailor make reports by using Style sheets, which can be applied on the reports. The applications of integrated tools using Style sheets give the system full flexibility to tailor make reports including all html elements. In a further enhancement of the system the option also exists to integrate a small target/personalized commercial content into the notifications. When new versions of current service or new services become available to subscribing users, the system is adapted to automatically acquire a system upgrade for the new versions or the new services. Also, in FIG. 1, is shown that the "MyPortal" and downloaded client from the content partners (500) can be branded/co-branded and limited to content partners domain and agreements with other partners.

Figure 2:
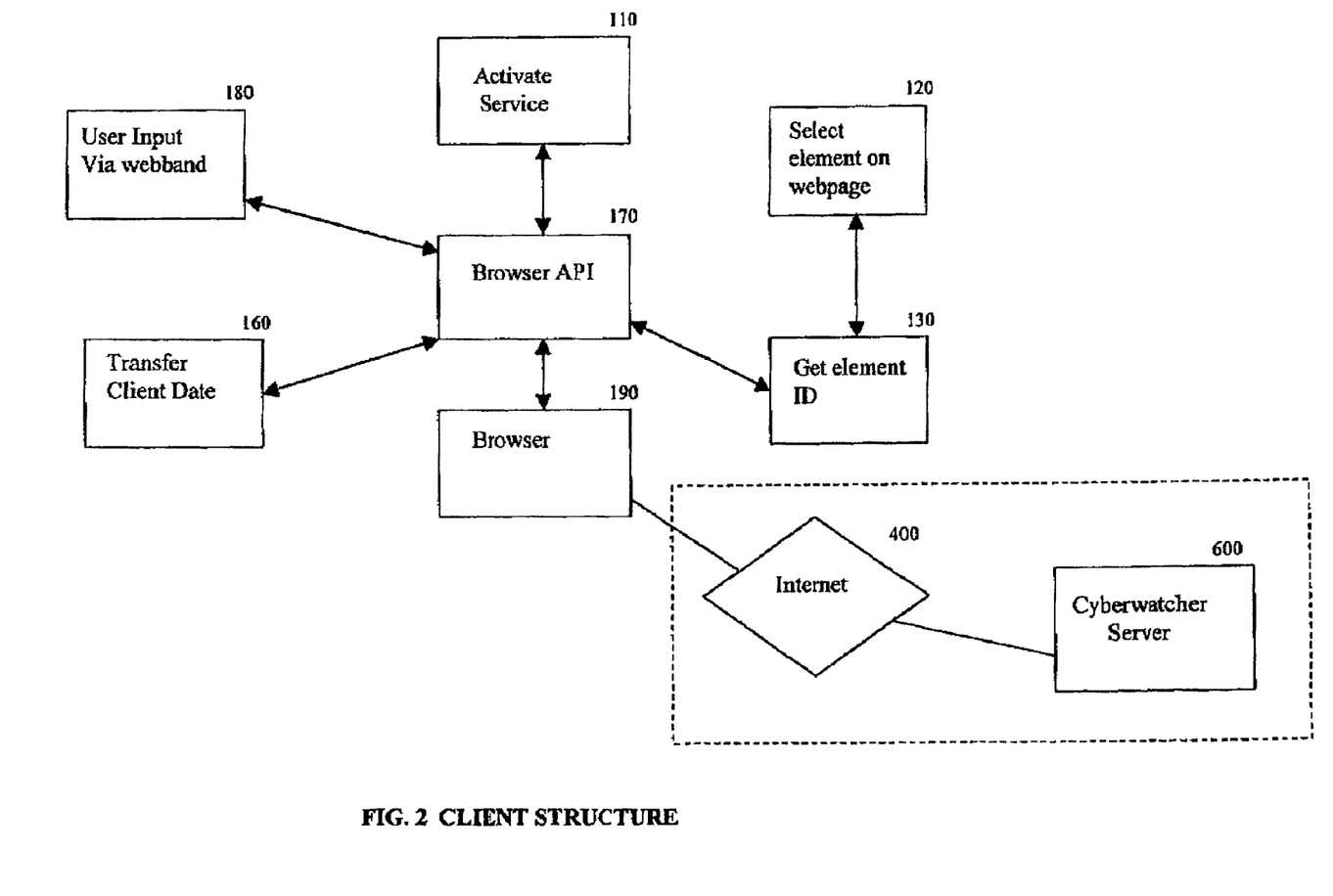
FIG. 2 is a block diagram of an exemplary structure of a client part of the invention.

Referring now to FIG. 2, the structure of the client part of the invention will be explained. The client structure example according to FIG. 2, shows the relevant elements of the client side, essentially constituting a software running on a PC (100) or non PC device, such as for example a set-top box, a PDA or a WAP, GPRS, or UMTS enable telephone (200). The client software is adapted to operate on top of a browser. In a preferred embodiment, the client is implemented as a plug-in to the browser (190). When implemented as a plug-in, the client software interfaces with the standard application program interface (API) (170) of the browser. The browser is in communication with the internet (400), meaning that the client software can communicate via the API (190) of the browser and then in turn with the "CyberWatcher" server (600). After client software (plug-in) download, installation of the client software effects an integration with the browser and provides the user with a new button in the browser toolbar. The new button is functionally linked to the client program, and will activate the monitoring service functions (110) when pressed. Service activation (110) opens a web band (180), which contains the graphical user interface for user interaction with the monitoring service. By the graphical user interface of the monitoring service, the user can select an element on a web page (120) or other similar structured information assembly displayed to the user by the browser. Having activated the service, the user can utilize the computer mouse to click on the element on the displayed information assembly, and effect drawing of a rectangle around the selected element. With an element selected, the "get element ID" (130) function calculates a unique element ID for the selected element, also describing the position of the selected object or element on the displayed web page. Through the graphical user interface of the service, the user is allowed to enter his/hers peronalization data through the web band (180), and to activate transferring of the calculated unique ID and position information together with the URL reference of the information assembly of interest, a time stamp, and keyword and notification information such as SMS/WAP/GPRS/UMTS or e-mail data provided by the user, by the "transferred client data" (160) function, to the "CyberWatcher" server part (600), via the internet (400) through the "CyberWatcher" server part (600).

Figure 3:
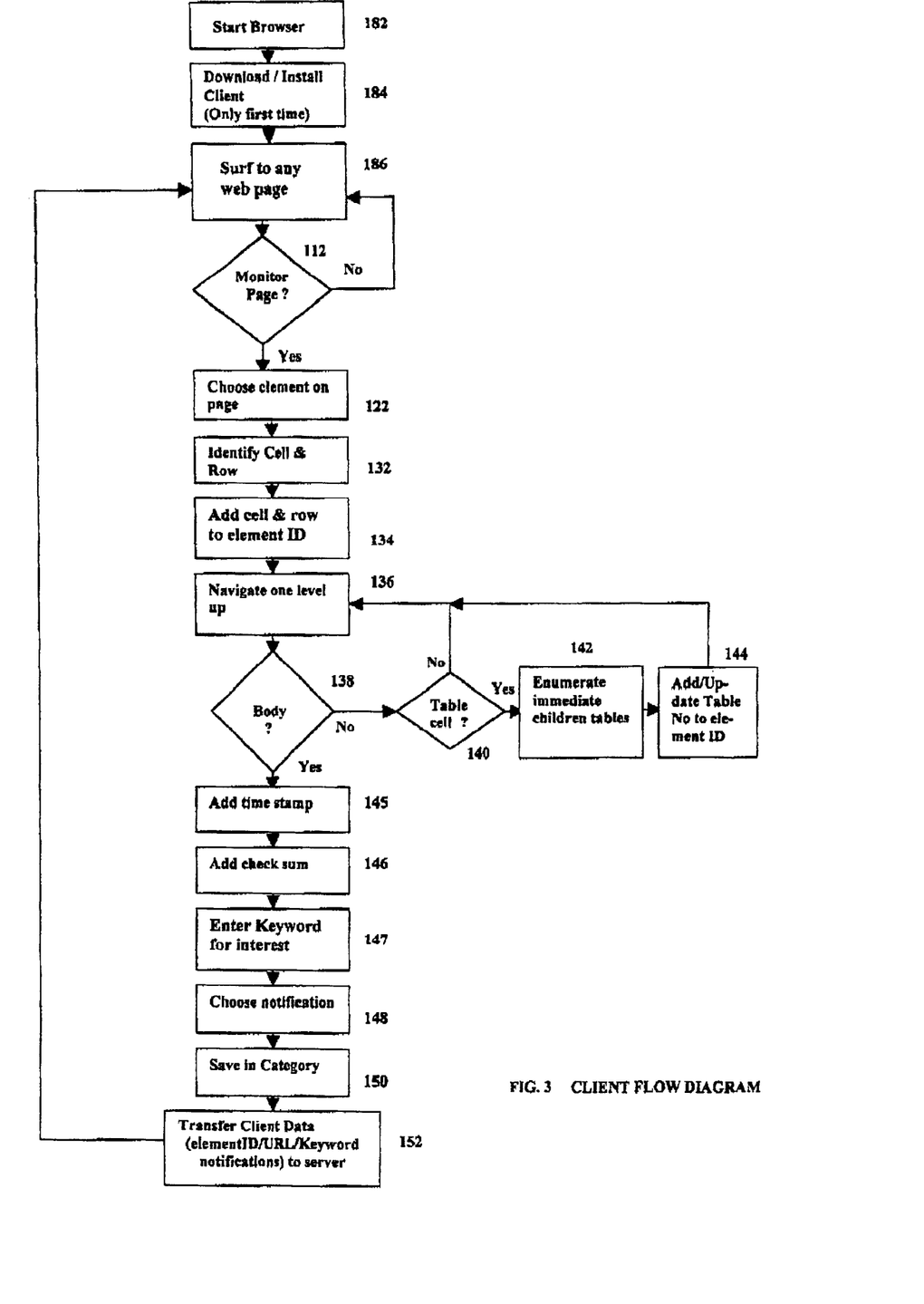
FIG. 3 is a flow charge of the operation of an exemplary client part of a solution according to the invention.
Figure 4:
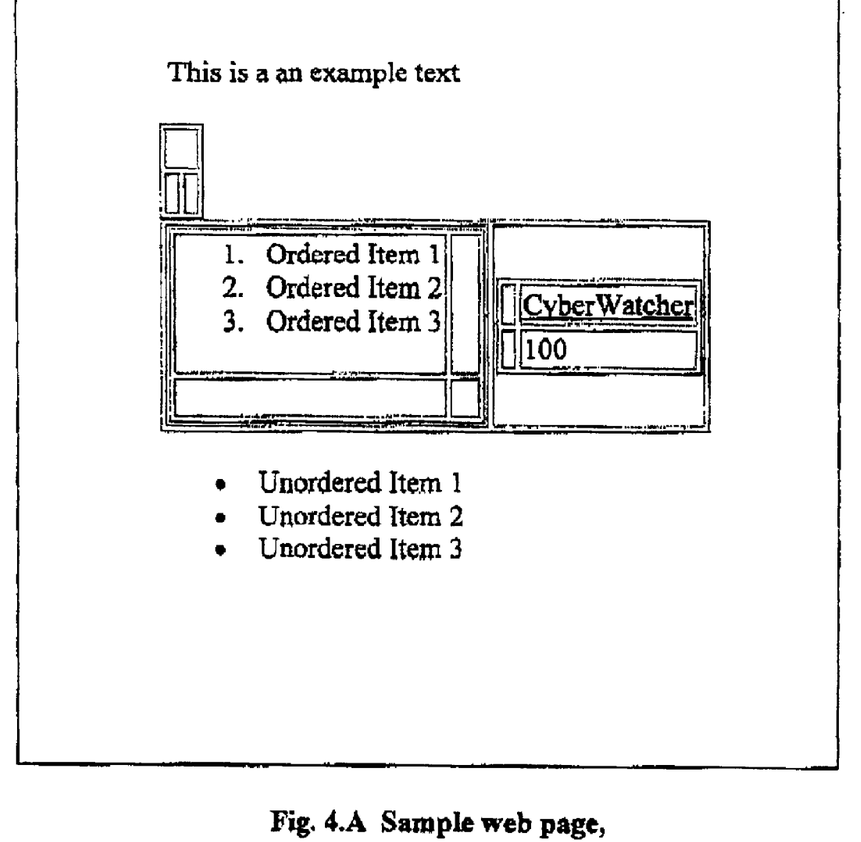

Referring now to FIG. 3, the operation of the client part of a solution according to the invention will be explained. The typical flow diagram shown in FIG. 4 shows the main operation flow in the client part (100). Typically, the client application is started after the user has started the browser (182), and has registered and downloaded the client part (100) software. Typically, the download is only made once, but the client part (100) software can also be installed from another program carrier, such as for example a diskette or a CD-ROM. After installing the client part (100) software on his/her computer, the user can surf to any web page (166), or even do a search into a database, which produces a web page or similar structured information item of interest as a result. Having found a web information assembly of interest, which the user wants to monitor (112), the user will press the service activation button in a toolbar of the browser to activate the monitoring service (110). With the service activated, the user can choose an element or object (122) on the displayed page by clicking with a mouse on the object of interest. The client part will draw a rectangle around the chosen element to indicate to the user which element has been selected. If the user is not satisfied with the element selected and shown, the user can narrow down the element by clicking again inside the currently selected element. In this way, it is possible to choose or select any part of a web page or similar information assembly, from the entire page, down to a single number or text contained in the page. When satisfied with the selection of the information object, the user indicates to the client part that selection is completed, and the client part can start processing to generate a unique element ID, running a process based on the fact that all structured information assemblies such as web pages, mainly are constituted of tables with cells containing any type of data. In this process, the row and column in the selected table (132) of the selected information object is identified. The row and column of the selected object in the selected table (132) is obtained by utilizing the appropriate API function (170) of the browser. Having found the current row and cell of the selected information object, row and cell data are stored in the element ID buffer (134). The process then goes on to find the table number of the current table holding the selected information element or object of interest. Finding the table number of the selected element or object is based on first finding the number of tables in the information assembly that are on the same level as the level of the table to which the selected object belongs, in the structure of the information assembly. In order to identify the number of cells that exist on the same level, the process starts to navigate one level up (136) from the currently selected cell. Having navigated one level up from the current selected cell, the process checks to see if the element constituting the next level above is a body element (138). If the check results in a "no", then the process goes on to check (140) if the element on the current level is a table element. If the result of the check (140) is "yes", then the process enumerates (142) the immediate children tables of the current table, and adds or updates the location identifier of the current table to the element ID buffer. On completing table add/update (144), then the process goes back to navigate one level up in the structure of the information assembly. If the result of the check (138) is "yes", indicating that the element on the current level is a body element, then the process has reached the top element of the structured web page. At this point, the process will have created a unique element ID for the selected information object, an ID that also contains the position of the selected object within the structure of the information assembly. Having completed the unique element ID, the process goes on to add a time stamp (145) and a checksum (146) of the element ID. Optionally, after having selected and identified the object on the web page, the user is allowed to enter his/her interest as a keyword (147), to choose a notification (148), and to save the entire configuration in a category (150), selected by the user. Typically, in a category is a list of selected web pages that belong to the same type, such as for example category called "Sport", which could contain a list of a selected number of sports URL references. To complete the process, a client data including the element ID, the URL reference of the information assembly, entered keywords and notification information is transferred (152) to the "CyberWatcher" server part (600).

Referring now to FIGS. 4a, 4b, 4c and 4d, the unique element ID will be explained in the following by way of example.

In FIG. 4a, a typical web page example is shown. The web page comprises various information items, such as a text paragraph, an unordered list, an ordered list, a list item and an anchor. The outermost frame of the web page represents the body element, while the smaller frames represent tables at various levels. The various information objects identifiable from the illustration in FIG. 4a, can also be identified from the corresponding tags found in the sample web page source found in FIG. 4d, which, when interpreted and displayed on the computer by means of a browser, will result in a web page structure as shown in FIG. 4a.

Referring now to FIG. 4b, the hierarchical structure of the web page of FIG. 4a (resulting when the sample web page source of FIG. 4d is read and displayed by a browser) also shows the various levels of tables and other information objects present in the sample web page. The web page of FIG. 4b also illustrates the hierarchy levels at which various information objects occur. Accordingly, it can be seen that the text string represented by the number "100" resides in the structure three levels down with respect to the body, as the object is contained in a cell of a table which in turn is contained in a cell of a table at one level up from the table holding the text string.

Referring now to FIG. 4c, the location information of the unique element ID generated for the information object (100) shown in FIGS. 4a and 4b will be explained. The element uniquely identifies the position of the object of interest, as the selected object "100" resides in the second row and second column of a second table contained in a table one level up, the table one level up itself being contained in the second column and first row of the second table at this particularly level. In other words, the structure shown applies to a web page containing a body, and two tables, where the last table contains two child tables. In addition, in the example shown, there are some paragraphs (P), an unordered list (UL), some list items (LI) and one anchor (A). Having selected the number "100" shown in the structure in FIG. 4a as the object to be monitored, the unique identifier of this object is generated as "/2_1_2/2_2_2", where the "/" means the start of a new table, and the following numbers are in a format denoting: TableNo_RowNo_CellNo.

Figure 5A:
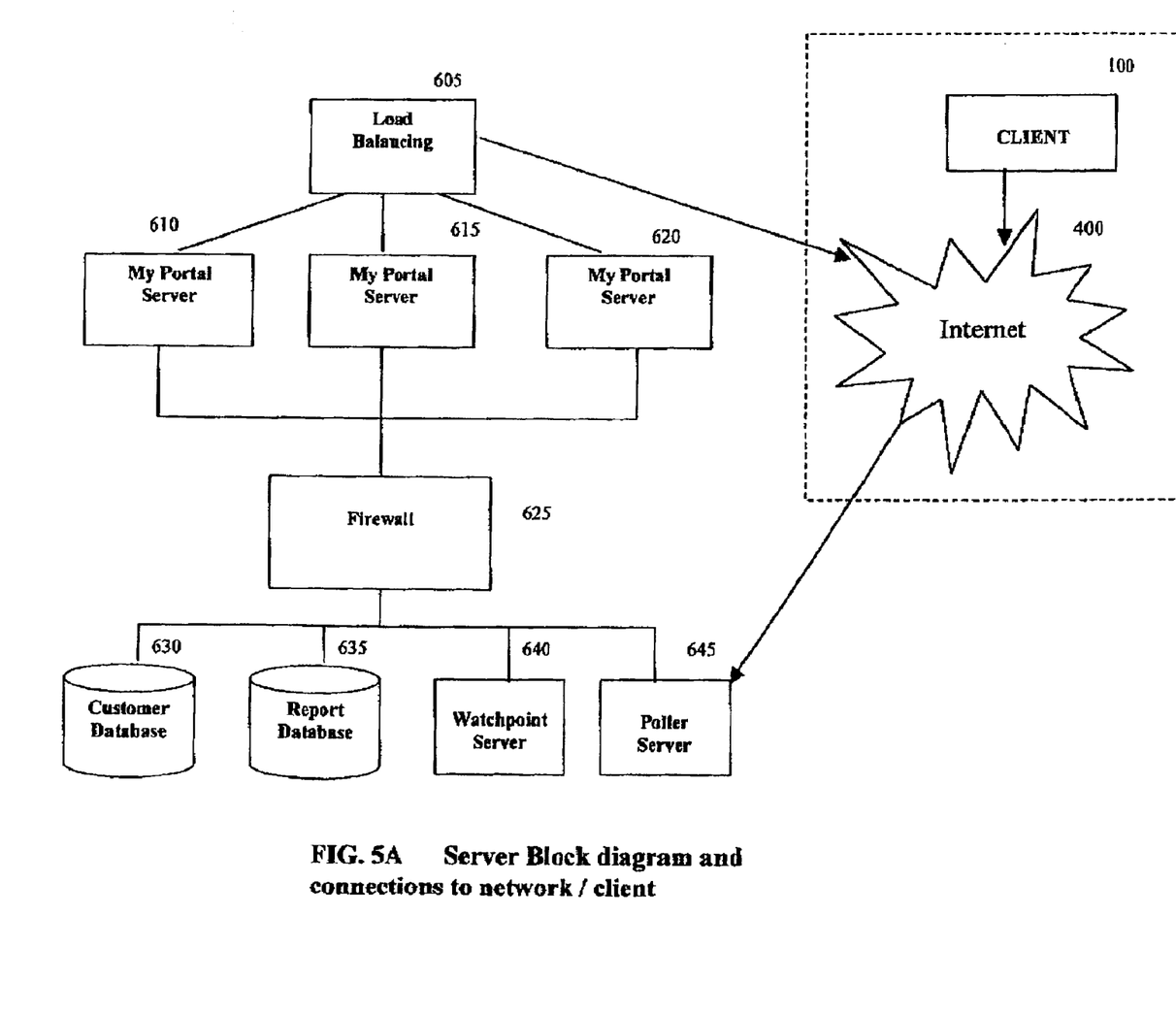

Referring now to FIG. 5a, an exemplary general structure of a server part of the present invention will be explained. The server arrangement includes a set of "MyPortal" server parts (610, 615, 620). These "MyPortal" server parts are essentially traditional web servers providing the known "MyPortal" personal web page service. Upon completing its operations for identifying a selected information object to be monitored, as explained above, the client (100) transfers the parameters and data explained previously, such as for example the unique ID together with a URL reference of the information assembly, a time stamp, a keyword and notification information, such as for example SMS(WAP/GPRS/UTMS or e-mail references, through the internet (400) to a "MyPortal" server part (610, 615, 620) assigned to the user. A load balancing arrangement (605) can be included, for routing of the incoming traffic to the different "MyPortal" servers, depending on their current traffic load. By including the load balancing arrangement (605), the system is well adapted to scale out by adding more "MyPortal" Servers based on demand. The customer database (630) is arranged to store and maintain all relevant data about subscribing users, such as for example e-mail address, telephone numbers and other system specific information of the users. The report database (635) of the arrangement contains all customer (i.e. user) specific reports generated by the system. These reports are stored advantageously as XML formatted reports, and are formatted by using XSL into the "MyPortal" personal web page of the respective user. The Poller Server (645) is arranged for polling URL references defined by a list of UL references to monitor (660), for all updates. The "WatchPoint" server (640) of the arrangement is arranged to check if any users have defined any objects of interest (670) for each of the URL references update. Parameters and data received from the client (100) are forwarded to update the WatchPoint server (640) and the Poller Server (645), respectively. Optionally, the arrangement can include a firewall (625) to protect the customer database (630), the report database (635), the WatchPoint server (640) and the Poller Server (645) from any external IP address. Accordingly, in an arrangement provided with a firewall, all communication into the servers that is made through any of the "MyPortal" servers (610, 615, 620) is communicated through the firewall (625).

Figure 5B:
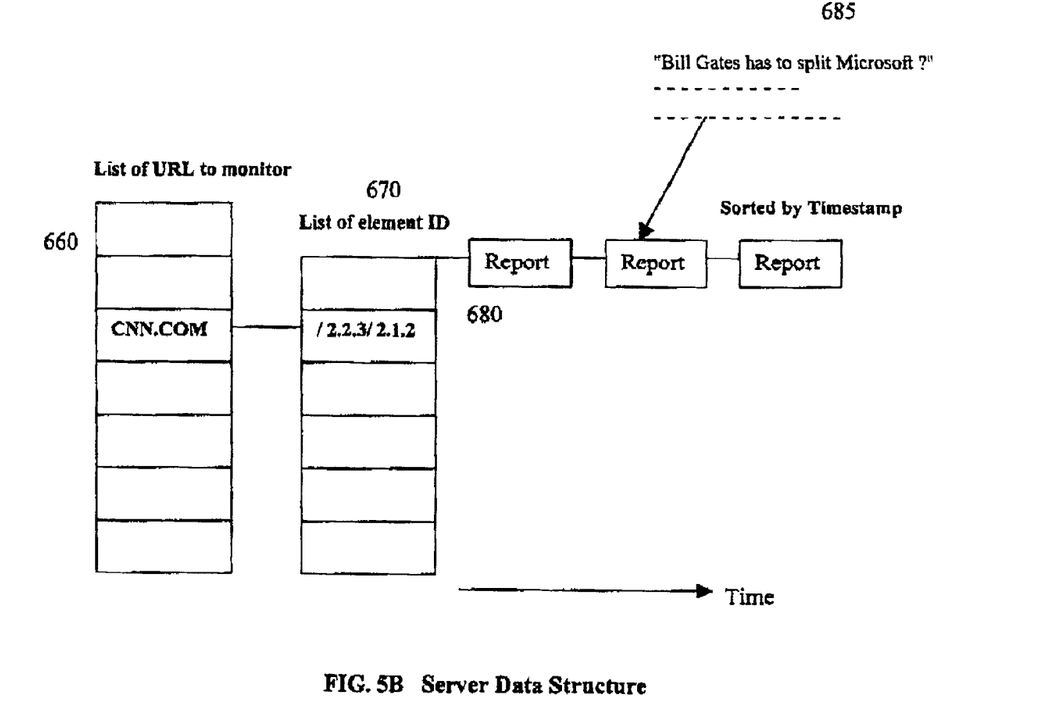
FIG. 5b is a block schematic diagram illustrating exemplary information assembly items for monitoring and information object identifiers, and a sequence of reports.

Now, with reference to FIG. 5b, a typical example of a server data structure of a server part of the invention will be explained. The basic part of the server data structure comprises a list of URL references to monitor (660). Preferably, this list contains the minimum common set of URL references received from all users. Furthermore, for each URL reference contained in a list of URL references to monitor, the server data structure comprises a list of element or object identifiers (670). The elements contained in the list (670) correspond to the unique object or element identifiers received from and s generated by clients (100) of users that have selected information objects or elements to be monitored. Each identifier of the list uniquely identifies the position and information content of the monitored object of a respective structured information assembly, such as a web page. Furthermore, for each of these user selected unique element identifiers, a link is maintained to a list of time stamp reports.

Figure 5C:
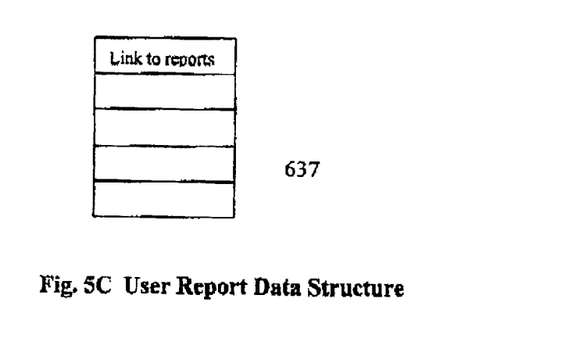
FIG. 5c illustrates an exemplary structure of user report data for a report shown in FIG. 5b.

Referring to FIG. 5c, an exemplary user report data structure is shown, where, for each user, there exists a list of links to reports (637). In this way, an actual report for a web page or other information item monitored can be provided to several users interested in monitoring the same information item. Accordingly, if two users have set a WatchPoint on the same page and element, then the actual URL reference (660), the associated unique element (670) and the report (680) only needs to be stored once. Only the user link to the actual report (637) is required in order to provide the report to all interested users.

Figure 6:
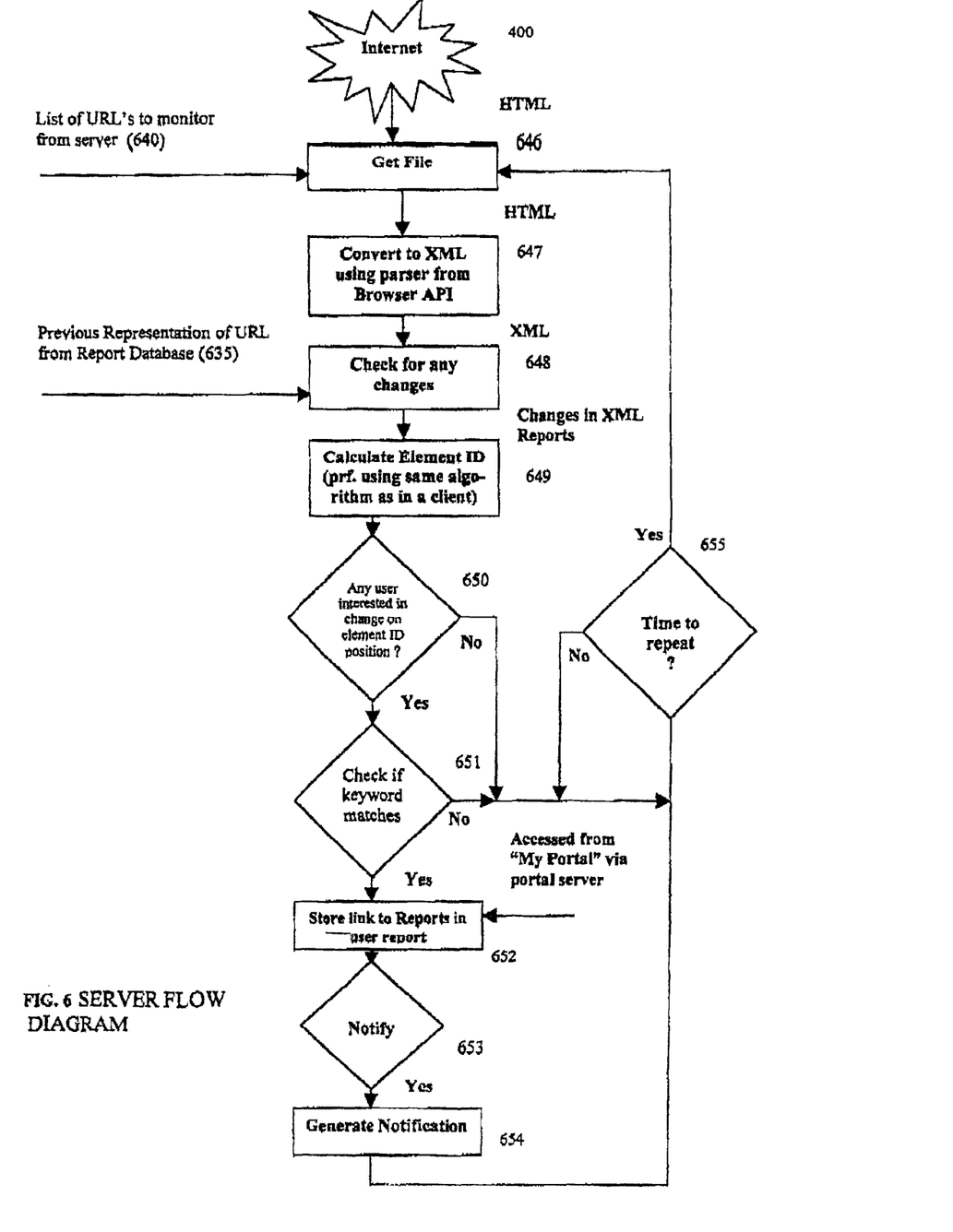
FIG. 6 is a flow diagram illustrating a workflow of an exemplary server part of a solution according to the invention.

Now, referring to FIG. 6 showing the server flow diagram, the operation of the server part of the invention will be explained. The server part obtains a list of URL references (660) from the WatchPoint server (640). This list of URL references contains a set of URL references selected for monitoring by the users through their respective clients (100). The "GetFiles" (646) function reads, in the example shown in FIG. 6, all html files for each URL reference defined in a list, as available from the internet (400). Each file is parsed using a parsing function available in a standard browser. Thus, the server part reading a html file, obtained from the information source in the same way as the client (100), will see the data by way of its associated browser as when the users makes the selection of the object to monitor. The acquisition of the information assembly, such as for example a web page, is herein also referred to as URL polling. By traversing the main loop shown in FIG. 6, the polling of an information assembly can be done repeatedly. The polling rate, that is the rate at which the "GetFiles" (646) acquires a web page or other information assembly containing an information object to be monitored, can be controlled through setting of fixed intervals or by intervals established on basis of previously registered update intervals of a respective information assembly. Furthermore, the "GetFiles" (646) function advantageously is arranged to utilize update information provided by protocols, such as e.g. the Internet Protocol, to check if the information entity carries content update indicator or some other update time indicator, in order to avoid using unnecessary resources in acquiring an information assembly that has not changed since a previous acquisition. Having acquired an information file representing an information assembly of interest, the information file is converted into XML, advantageously by accessing, by means of an API, an XML parser (647) integrated in the browser. However, a skilled person in the art will appreciate that the processing of the server part can also be done on basis of structured information provided in html format, or some other format that is structurally similar to the formats employed in html and/or XML information assemblies. The acquired information file, preferably converted into XML format, is checked, in step (648), by comparing the newly acquired XML file to previously acquired XML representation of the same information assembly or web page. Previous representations are obtained by accessing the Poller Server (645). Having found that the information assembly has been changed since a previous acquisition, the process goes on to generate and assign a unique element ID (649) using the same method as explained for the client part of the invention (see FIGS. 3 and 4a–d) In this way, the server part of the invention builds a list containing unique element ID's for all elements of a structured information assembly that has been found changed since a previous acquisition. By comparing unique element ID's for a specific object, the process identifies those objects that have been subject to change since a previous acquisition. Next, the process processed. If an interested subscribing user is found, then the process goes on to check if the keyword presented by the user matches the keyword of the registered change (651). On the other hand, if no subscribing user interested in the change is found, then the process goes back into the loop to check if it is time to reacquire the information assembly. Having found the user interested in a change, and a match in the keywords, the process goes on to store a link to the report (652) for all users that are monitoring the particular elements on the URL reference being investigated. Next, the process checks to find if any of the interested subscribing users have subscribed to receive a notification of the change. If the check results in one or more users to be notified, then the notification generator (654) is activated, the notification generated typically converting the data of the processed information assembly, into a proper format for the receiving party, such as for example a gateway of a third party to a physical distribution net, such as for example SMS, WAP, GPRS or UMTS. For a user subscribing to the service having a "MyPortal" established by way of the server part of the invention, the user can be notified by a message delivered to the user through the "MyPortal" server (610, 615, 620).

What is claimed is:

1. A method of identifying a change of an information object contained in a structured web information assembly, and a method comprising:
    a) specifying a structured web information assembly,
    b) acquiring said specified web information assembly from a source,
    c) selecting a first information object of said web information assembly,
    d) obtaining a structure location of said selected first information object within said structured information assembly and determining a first information object ID of said selected first information object on a basis of the selected first information object itself and a web page position of the selected first information object,
    e) generating by a coding method a first identifier characteristic of said selected first information object,
    f) reacquiring said specified web information assembly from said source,
    g) obtaining a second information object located at said structure location within said reacquired web information assembly,
    h) generating by said coding method a second identifier characteristic of said second information object, and
    i) generating a change indicator if said second identifier is different from said first identifier,
    wherein, determining the information object ID of the selected first information object, further comprises the steps of
    j) determining the web page table level of the web page table containing the selected information object;
    k) setting a position and level variable to the selected object position and the web page level determined in step j);
    l) determining a web page row and column position of an information object at the position and level of the variable, and appending to the information object ID the position and level variable;
    m) determining the object type of the selected information object, and if the object type is different from the body, then including the steps of:
    n) navigating in the structured information assembly to a position one level up from the current level,
    o) setting the position and level variable to the position and level navigated to in step n), and repeating the steps l)–m).

2. A method for monitoring a selected first information object of a web page, comprising:
    browsing the web page and determining a first information object ID of the selected first information object on a basis of the selected first information object itself and a web page position of the selected first information object;
    storing the first information object ID in an information object ID buffer;
    storing a URL of the web page in the information object ID buffer;
    browsing the web page corresponding to the URL stored in the information object ID buffer at a predetermined period subsequent to determining the first information object ID, and determining a second information object ID of a second information object at a web page position corresponding to the position of the selected information object, on a basis of the second information object itself and the web page position of the second information object;
    comparing the first information object ID and the second information object ID; and,
    generating a notification of change of the web page corresponding to the URL if the second information object ID is different from the first information object ID,
    wherein determining the information object ID of the selected first information object, further comprises the steps of
    j) determining the web page table level of the web page table containing the selected information object;
    k) setting a position and level variable to the selected object position and the web page level determined in step j);
    l) determining a web page row and column position of an information object at the position and level of the variable, and appending to the information object ID the position and level variable;

m) determining the object type of the selected information object, and if the object type is different from the body, then including the steps of:

n) navigating in the structured information assembly to a position one level up from the current level, l) setting the position and level variable to the position and level navigated to in step n), and repeating the steps l)–m).

3. An arrangement for detecting a web page change in a computer network comprising a server and a client, comprising:

the client comprising a) a means for determining a first information object ID of a browsed web page first information object selected by a user and storing the first information object ID in an information object ID buffer;

b) a means for obtaining a time at which the first information object ID is determined and storing the time in the information object buffer;

C) a means for obtaining a URL corresponding to the browsed web page and storing the URL in the information object ID buffer;

d) a means for transferring the information object ID buffer contents to the server;

the server comprising e) a means for browsing the web page at a predetermined period subsequent to the time of determining the first information object ID;

f) a means for selecting from the browsed web page a second information object at a position corresponding to the position of the first information object and determining a second information object ID of the selected second information object on a basis of the selected information object itself and the web page position of the selected information object;

g) a means for comparing the first information object ID and the second information object ID; and, h) a means for generating a notification of change of the web page corresponding to the URL if the second information object ID is different from the first information object ID, wherein determining the information object ID of the selected first information object, i) determines the web page table level of the web page table containing the selected information object;

ii) sets a position and level variable to the selected object position and the web page level determined in the determination i);

iii) determines a web page row and column position of an information object at the position and level of the variable, and appends to the information object ID the position and level variable;

iv) determines the object type of the selected information object, and if the object type is different from the body, then v) navigates in the structured information assembly to a position one level up from the current level, vi) sets the position and level variable to the position and level navigated to in the navigation v), and repeats the determination iii) and the determination iv).

4. A client/server arrangement in a system of networked computers for detecting a change of an information object contained in a structured web information item, said arrangement comprising:

a) a client means and a first web browser operating on a first computer, said client means being adapted to communicate with said first web browser, said client means being arranged to generate a first location specifying identifier characteristic of a user selected first information object included in said web information item displayed to the user means of said first web browser and to forward said first location specifying identifier to said server and to determine a first information object ID of said selected first information object on a basis of the selected first information object itself and a web page position of the selected first information object, and a server means and a second web page browser operating on a second computer, said server means being adapted to communicate with said second web page browser, said server means being arranged to generate a second identifier characteristic of a second information object included in the web information item at the location specified by the first identifier and to generate an indicator of change if the second identifier is different from the first identifier, wherein determining the information object ID of the selected first information object, i) determines the web page table level of the web page table containing the selected information object;

ii) sets a position and level variable to the selected object position and the web page level determined in the determination i);

iii) determines a web page row and column position of an information object at the position and level of the variable, and appends to the information object ID the position and level variable;

iv) determines the object type of the selected information object, and if the object type is different from the body, then v) navigates in the structured information assembly to a position one level up from the current level, vi) sets the position and level variable to the position and level navigated to in the navigation v), and repeats the determination iii) and the determination iv).

* * * * *